US012810337B2

(12) United States Patent
Phatak et al.

(10) Patent No.: US 12,810,337 B2
(45) Date of Patent: Nov. 24, 2026

(54) SYSTEM AND METHOD FOR PERSONALIZING THE RANKING OF RECENTLY VIEWED ITEMS

(71) Applicant: Walmart Apollo, LLC, Bentonville, AR (US)

(72) Inventors: Abhijeet Rajendra Phatak, Sunnyvale, CA (US); Harshal Tripathi, Sunnyvale, CA (US); Chittaranjan Tripathy, Sunnyvale, CA (US); He Wen, Menlo Park, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 195 days.

(21) Appl. No.: 18/659,952

(22) Filed: May 9, 2024

(65) Prior Publication Data

US 2025/0348916 A1 Nov. 13, 2025

(51) Int. Cl.
*G06Q 30/00* (2023.01)
*G06Q 30/0201* (2023.01)
*G06Q 30/0601* (2023.01)

(52) U.S. Cl.
CPC ..... *G06Q 30/0631* (2013.01); *G06Q 30/0201* (2013.01); *G06Q 30/0623* (2013.01)

(58) Field of Classification Search
CPC ........... G06Q 30/0631; G06Q 30/0201; G06Q 30/0623
See application file for complete search history.

(56) References Cited

U.S. PATENT DOCUMENTS

| | | | | |
|---|---|---|---|---|
| 10,410,138 | B2 | 9/2019 | Maor et al. | |
| 10,572,103 | B2 | 2/2020 | Missig et al. | |
| 2012/0210241 | A1 | 8/2012 | Wong et al. | |
| 2021/0240786 | A1 | 8/2021 | Pendse et al. | |
| 2021/0264467 | A1 | 8/2021 | Boal | |
| 2023/0113506 | A1* | 4/2023 | Pollock | G06F 16/9535 705/7.29 |
| 2024/0242260 | A1* | 7/2024 | Shanker | G06Q 30/0631 |

OTHER PUBLICATIONS

Lo, Chieh, et al. "Page-level optimization of e-commerce item recommendations." Proceedings of the 15th ACM Conference on Recommender Systems. 2021. (Year: 2021).*

* cited by examiner

*Primary Examiner* — Anand Loharikar
(74) *Attorney, Agent, or Firm* — DICKINSON WRIGHT RLLP; Hector A. Agdeppa

(57) ABSTRACT

A method can include determining one or more features associated with a user and also associated with recently viewed items for the user. The method further can include determining, at least in part by a machine learning model, a respective engagement score for each of the recently viewed items based on one or more first features of the one or more features. The one or more first features can be determined by a correlation analysis of the one or more features in a training process of the machine learning model. The method additionally can include ranking the recently viewed items based on the respective engagement score for each of the recently viewed items. The method also can include transmitting, via a computer network to a user device of the user, the recently viewed items, as ranked, for display on the user device. Other embodiments are disclosed.

20 Claims, 7 Drawing Sheets

SYSTEM AND METHOD FOR PERSONALIZING THE RANKING OF RECENTLY VIEWED ITEMS

TECHNICAL FIELD

This disclosure relates generally to techniques for personalizing item recommendations.

BACKGROUND

Retailers seek to increase users' engagement with items by various promotional techniques. One of the common techniques is to display previously viewed items to remind a user of items in which the user previously showed interest. Conventional platforms generally show the recently viewed items in reverse-chronological order, assuming that the user would be more interested in items more recently viewed. However, such an assumption is not always correct. Thus, systems and methods are desired for personalizing the ranking and order of the recently viewed items to be displayed to the user to increase the likelihood of engagement with such items.

BRIEF DESCRIPTION OF THE DRAWINGS

To facilitate further description of the embodiments, the following drawings are provided in which.

Figure 1:
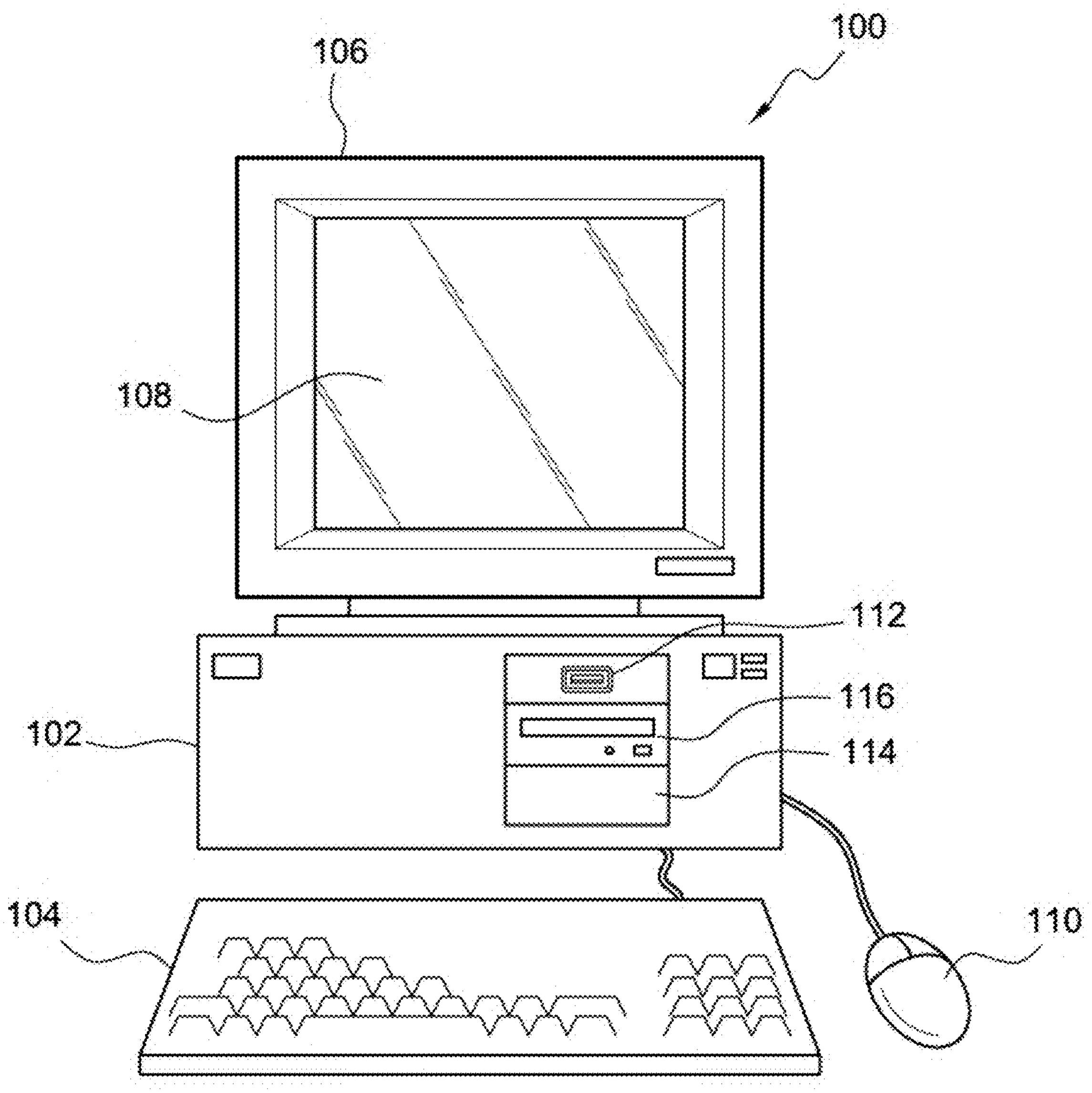
FIG. 1 illustrates a front elevation view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

Figure 2:
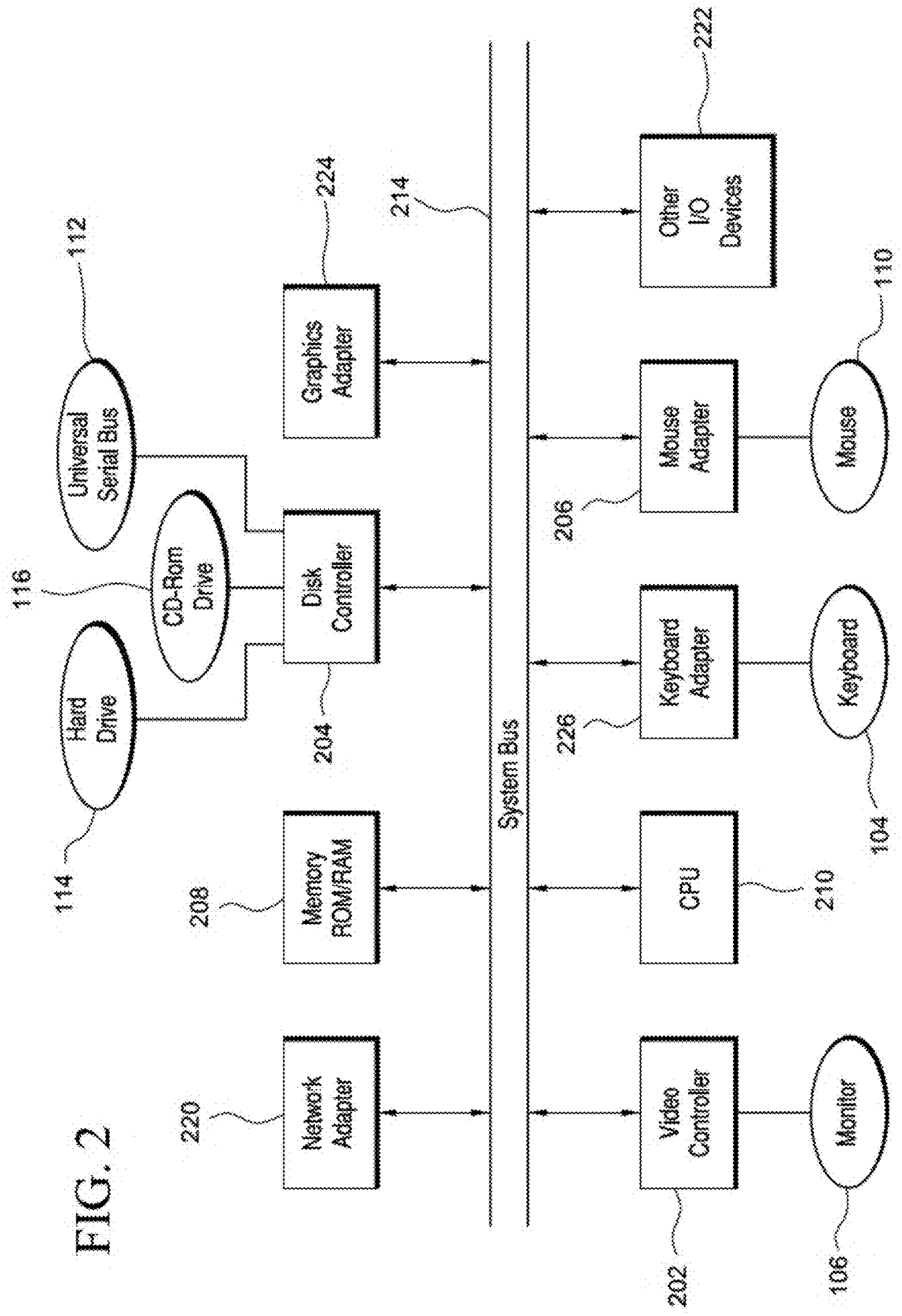
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refers to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICS.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such Block as a smartphone. In certain additional embodiments, computer system 100 may comprise an embedded system.

Figure 3:
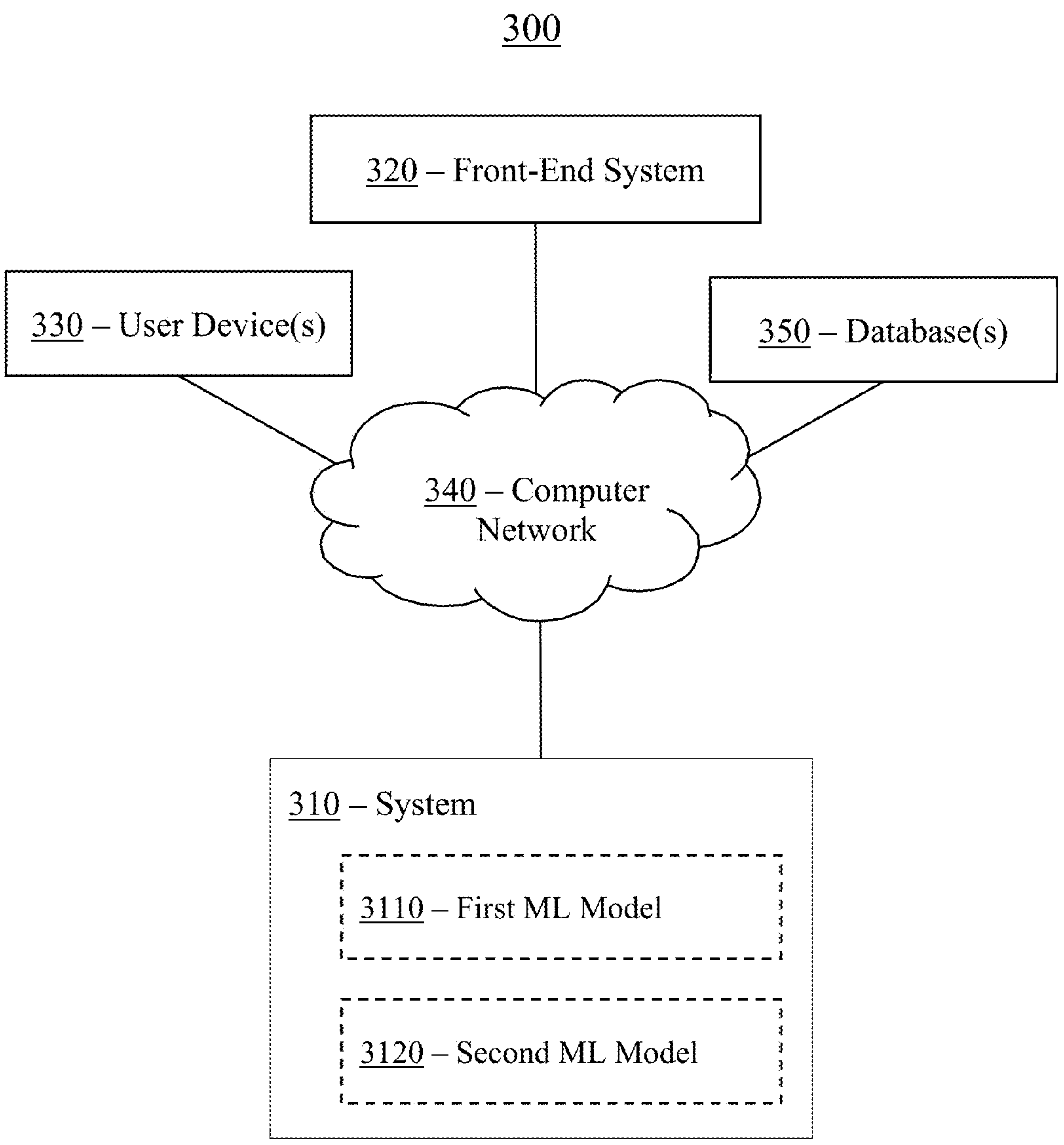
FIG. 3 illustrates a system for personalizing the ranking of recently viewed items for a user, according to an embodiment.

Turning ahead in the drawings, FIG. 3 illustrates a block diagram of a system 300 that can be employed for personalizing the ranking of recently viewed items for a user according to an embodiment. System 300 is merely exemplary and embodiments of the system are not limited to the embodiments presented herein. The system can be employed in many different embodiments or examples not specifically depicted or described herein. For example, the system can be used for an online retailer to promote items that the user already showed interest in and increase the likelihood of engagement and the potential for conversion.

In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein. In many embodiments, operators and/or administrators of system 300 can manage system 300, the processor(s) of system 300, and/or the memory storage unit(s) of system 300 using the input device(s) and/or display device(s) of system 300, or portions thereof in each case.

Referring to FIG. 3, in many embodiments, system 300 can include a system 310, a front-end system 320, a user device(s) 330, and/or a database(s) 350. System 310 further can include one or more elements, modules, models, or systems, such as a first ML (Machine Learning) model 3110, and a second ML model 3120, etc., to perform various procedures, processes, and/or activities of system 300 and/or system 310. Each of first ML model 3110 and second ML model 3120 can include one or more functions, algorithms, modules, models, and/or systems and can be pre-trained or re-trained.

System 310, front-end system 320, user device(s) 330, first ML model 3110, and/or second ML model 3120 can each be a computer system, such as computer system 100 (FIG. 1), as described above, and can each be a single computer, a single server, or a cluster or collection of computers or servers, or a cloud of computers or servers. In another embodiment, a single computer system can host system 310, front-end system 320, user device(s) 330, first ML model 3110, and/or second ML model 3120. Additional details regarding system 310, front-end system 320, user device(s) 330, first ML model 3110, and/or second ML model 3120 are described herein.

In many embodiments, system 310 can be in data communication with front-end system 320, using a computer network (e.g., computer network 340), such as the Internet and/or an internal network that is not open to the public. In some embodiments, an internal network (e.g., computer network 340) that is not open to the public can be used for communications between system 310 and front-end system 320 within system 300. In several embodiments, system 310 can include front-end system 320, or vice versa.

In some embodiments, system 310 and/or front-end system 320 can be in data communication with user device(s) 330, using a computer network (e.g., computer network 340), such as the Internet and/or an internal network that is not open to the public. In some embodiments, user device(s) 350 can be used by users, such as users for an online retailer's websites, customers or potential customers for a retailer, and/or a system operator or administrator (e.g., a machine learning engineer or a data scientist) for system 310 and/or front-end system 320. In a number of embodiments, front-end system 320 can host one or more websites and/or mobile application servers. For example, front-end system 320 can host a website, or provide a server, that interfaces with an application (e.g., a mobile application or a web browser) on user device(s) 350, which can allow users to browse, search, and/or order products, and/or schedule order deliveries, in addition to other suitable activities. In some embodiments, an internal network (e.g., computer network 340) that is not open to the public can be used for communications between or among system 310, front-end system 320, and/or user device(s) 350 within system 300.

In certain embodiments, the user devices (e.g., user device(s) 350) can be a mobile device, and/or other endpoint devices used by one or more users. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device (e.g., smart glasses, smart watches, an augmented-reality (AR) headset, a virtual-reality (VR) headset, etc.), or another portable computer device with the capability to present audio and/or visual data (e.g., images, videos, music, etc.). Thus, in many examples, a mobile device can include a volume and/or weight sufficiently small as to permit the mobile device to be easily conveyable by hand. For example, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, system 310 can include one or more input devices (e.g., one or more keyboards, one or more keypads, one or more pointing devices such as a computer mouse or computer mice, one or more touchscreen displays, a microphone, etc.), and/or can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 310. In a similar manner, the processors and/or the non-transitory computer-readable media can be local and/or remote to each other.

Meanwhile, in many embodiments, system 310 also can be configured to communicate with and/or include a database(s) 350. In certain embodiments, database(s) 350 can include a product catalog of a retailer that contains information about products, items, or SKUs (stock keeping units), for example, among other data as described herein. In another example, database(s) 350 can include information about market analysis and/or product research, for example, among other data as described herein. In several embodiments, database(s) 350 further can include training data (e.g., synthetic training data, historical input/output data, tags for the synthetic and/or historical data, historical effects of the outputs, user or system feedback, etc.) and/or hyperparameters for training and/or configuring system 310, first ML model 3110, second ML model 3120, etc. In many embodiments, database(s) 350 further can include a user profile database that contains user profiles, including information such as account data, billing or shipping addresses, payment methods, historical engagement data, historical transaction data, etc.

In a number of embodiments, database(s) 350 can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more data sources, that particular database can be stored on a single memory storage unit or the contents of that particular database can be spread across multiple ones of the memory storage units storing the one or more databases, depending on the size of the particular database and/or the storage capacity of the memory storage units. In similar or different embodiments, the one or more data sources can each be a computer system, such as computer system 100 (FIG. 1), as described above, and can each be a single computer, a single server, or a cluster or collection of computers or servers, or a cloud of computers or servers.

Database(s) 350 can include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

In many embodiments, communication between system 310, front-end system 320, user device(s) 330, database(s) 350, first ML model 3110, and/or second ML model 3120 can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc.

The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Still referring to FIG. 3, system 310 can present recently viewed items for a user based on one or more ranking, processing, and/or filtering criteria, according to an embodiment. System 310 can transmit, via computer network 340, the recently viewed items, as ranked, processed, and/or filtered, for display on a user interface a user device 330 of the user. In many embodiments, system 310 can determine one or more features associated with a user and also associated with recently viewed items for the user. The recently viewed items for the user can include items engaged by the user in one or more prior sessions and/or a current session (or one or more prior and/or current visits) at system 300 or front-end system 320. A session can include a series of user interactions within a predetermined time frame (e.g., 5 minutes, 15 minutes, 20 minutes, etc.) or until the session terminates or left idle until a time-out happens, and a visit can include one or more continued sessions.

In many embodiments, one or more features associated with the user can be obtained from, or determined in real-time based on, information in a user profile for the user in a user database (e.g., database(s) 350). Exemplary sources of the one or more features associated with the user can include: (a) historical user behavior data collected from one or more prior sessions or visits; (b) historical engagement data (e.g., product listings browsed, items added to cart or purchased, search queries, etc.) collected from one or more prior sessions or visits; (c) current user behavior data collected from the current session; (d) current engagement data collected from the current session or visit; and so forth. Exemplary historical user behavior data can include the respective recency, frequency, and/or respective dwell time of each of the one or more prior sessions or visits.

In a number of embodiments, one or more features associated with the recently viewed items for the user can be obtained from, or determined in real-time based on, information in one or more product database(s) (e.g., database(s) 350). Exemplary sources of the one or more features associated with the recently viewed items can include: (a) item statistics (e.g., trending items, bestsellers, the seasonality and one or more other scores for each item); (b) item pricing and promotions; and so forth. Examples of one or more features associated with both the user and the recently viewed items can include user propensities and/or preferences (e.g., affinities to brands, attributes, taxonomy, etc.). In several embodiments, an initial set of features can include all of the features associated with the user and/or items or a selective group of features determined by system 310 and/or a system user (e.g., a machine learning engineer, a data scientist, etc.).

In some embodiments, system 310 further can determine a respective engagement score for each of the recently viewed items for the user based on one or more first features of the one or more features. In many embodiments, the respective engagement score for each of the recently viewed items can indicate a likelihood of engagement by the user and thus be an integer in the range of 0 to 1. The respective engagement score for each recently viewed item can be determined based on a formula comprising a weighted sum associated with the one or more first features. In a number of embodiments, the one or more first features can be determined to have greater significances in or impact on the user's engagement behavior, and the rest of the one or more features can be determined to have no or little (e.g., less than 0.05% or 0.1%) significance or impact and thus be ignored from the determination of the respective engagement score.

In a few embodiments, the one or more first features of the one or more features can be determined based on any suitable approaches or criteria. In certain embodiments, the one or more first features can be determined by a correlation analysis of the one or more features. In an exemplary embodiment, a first criterion for determining the one or more first features from the one or more features can be that a sum of weights associated with the one or more first features in the formula is greater than a predetermined threshold (e.g., 90%, 95%, etc.). In another embodiment, a second criterion can be that a respective weight associated with each of the one or more first features is greater than another predetermined threshold (e.g., 1%, 3%, 5%, etc.). In yet another embodiment, system 310 can use both the first and the second criteria to determine the one or more first features of the one or more features.

In many embodiments, system 310 can use a machine learning model (e.g., first ML model 3110 or second ML model 3120) trained to determine, in real-time, the respective engagement score for each of at least some of the one or more recently viewed items (e.g., the recently viewed items engaged by the user in the current session). Examples of the machine learning model can include a linear regression model, a Lasso model, an XGBoost model, a gradient boosting model, a random forest model, neural network models such as recurrent networks, transformers and Seq2Seq models or the like, and for diversification of recommendations a reinforcement learning based explore-exploit mechanism can implemented using a Multi-Armed Bandit (MAB) model, etc. In several embodiments, when the one or more recently viewed items include one or more prior items engaged by the user in one or more prior sessions or visits, but not the current session or visit, at front-end system 320, system 310 can determine the respective engagement score for each of these one or more prior items by: (a) determining whether a respective prior engagement score for each prior item exists, and (b) upon determining that the respective prior engagement score exists, using the respective prior engagement score as the respective engagement score. In a number of embodiments, the respective prior engagement score can be associated with an expiration time, and system 310 can use the respective prior engagement score as the respective engagement score for a prior item only when the expiration time for the prior item has not expired.

In several embodiments, the one or more first features can be determined by any suitable approaches or methods for analyzing the one or more features and/or the relationship between or among the one or more features. For example, system 310 can adopt a correlation analysis of the one or more features in a training process of the machine learning model. The training process can include training the machine learning model and re-training the machine learning model, occasionally, regularly, and/or periodically. In some embodiments, system 310 further can determine the one or more first features (e.g., features with more significant or greater-than-a-threshold effects on the output of the machine learning model) among the one or more features (e.g., an initial set of features, or a group of first features determined in previous trainings) based on the updated respective weights for the one or more features by the machine learning model (e.g., first ML model 3110).

In many embodiments, system 310 additionally can rank the recently viewed items based on the respective engagement score for each of the recently viewed items and then transmitting, via a computer network (e.g., computer network 340) to a user device (e.g., user device(s) 350) of the user, the recently viewed items, as ranked, for display on the user device (e.g., via a user interface, a webpage, a mobile application, etc.) to remind the user of the items that they may want to re-engage and eventually purchase.

Still referring to FIG. 3, in some embodiments, system 310 further can perform one or more post-ranking acts to process (e.g., re-ranking or removing) each of the recently viewed items before transmitting the recently viewed items for display on the user device. In a number of embodiments, after ranking the recently viewed items based on the respective engagement score, system 310 further can diversify the recently viewed items across item categories, brands, or colors. System 310 can diversify the recently viewed items using a second machine learning model (e.g., second ML model 3120, an MAB model, a linear regression model, an XGBoost model, a large language model (LLM), etc.) trained to re-rank the recently viewed items based on item taxonomies (e.g., laptops vs. cell phones, household essentials vs. home, personal care vs. beauty, etc.), brands, and/or colors of the recently viewed items, etc.

In certain embodiments, the second machine learning model can be trained to adjust (e.g., increase or decrease) the respective engagement score for each recently viewed item to increase the diversity of all of the recently viewed items or the top ranking items (e.g., top 10 items, top 20 items, top 30% or 50% of the items) among the recently viewed items. In a few embodiments, the second machine learning model can be trained to generate a re-ranked or re-sorted list of the recently viewed items to promote diversity within the recently viewed items based on item taxonomies, brands, and/or colors of the recently viewed items. In many embodiments, the first machine learning model for determining the respective engagement score for each recently viewed item for a user and the second machine learning model for promoting diversity in the recently viewed items can use similar or different algorithms based on similar or different sets of features associated with the user and/or the recently viewed items.

In some embodiments, system 310 further can determine a final list of recently viewed items from the ranked/re-ranked recently viewed items to be transmitted to and displayed on the user device based on a predetermined rank limit (e.g., top 5, top 10, top 15, top 30, etc.) or a predetermined percentage limit (e.g., top 5%, top 20%, top 50%, top 80%, etc.). In some embodiments, system 310 can determine the final list of recently viewed items by removing one or more low-ranking items so that the final list of recently viewed items includes only items ranked higher than or equal to the predetermined rank limit or the predetermined percentage limit in the recently viewed items, as ranked, and not include the rest (e.g., the one or more low-ranking items) of the recently viewed items. In similar or different embodiments, the final list of recently viewed items can include some or all of the top ranking items, as re-ranked and diversified. That is, the predetermined rank limit or the predetermined percentage limit for determining the final list of recently viewed items and that for determining the top ranking items of the recently viewed items, as diversified, can be the same or different.

In many embodiments, system 310 also can filter out one or more filtered items from the recently viewed items based on one or more criteria. Examples of the criteria for filtering out the one or more filtered items can include out-of-stock items, sensitive items (e.g., content including violence, animal abuse, nudity, sexual acts, etc.), and/or items included in one or more user-specified constraints (e.g., a price range, a minimum review score, a selected brand, a specific item size, etc.) received from the user device.

In a number of embodiments, system 310 further can train or re-train the machine learning model for determining the respective engagement score (e.g., first ML model 3110) and/or the second machine learning model for increasing diversity (e.g., second ML model 3120). System 310 can train the machine learning model (or the second machine learning model) based on a training dataset before determining the respective engagement score. In many embodiments, the training dataset can include: (a) historical input data and historical output data stored in a database (e.g., database(s) 350); and/or (b) sample training data selected or generated by system 310 and/or a system user (e.g., a data scientist or a machine learning engineer, etc.). The historical input data can include one or more training features associated with: (a) customers that can include or not include the user (e.g., when the user is a new or prospective customer) and/or (b) historically-engaged items for the customers. The historical output data can include whether (and/or how) the customers engaged with the historically-engaged items. For example, the historical output data can include a record indicating that an item browsed by a customer was or was not clicked-through or added to cart.

In some embodiments, the one or more training features can include an initial set of training features at the beginning, and later include a smaller or larger set of training features than the initial set of training features after one or more training processes. For example, a training feature that consistently has a low weight or impact (e.g., less than 1%, 0.5%, etc.) on the output (e.g., engagement scores) of the machine learning model can be removed from the one or more training features. A new training feature associated with a user and/or an item can be added to the one or more training features during the training process(es) when new items are added or when system 310 or the system user identifies a new feature that may affect the output of the machine learning model. In similar or different embodiments, the one or more training features can remain the same regardless of the quantity of training processes being performed. In a few embodiments, the one or more training features can include more, fewer, or the same types than those of the one or more features extracted from the user and/or the recently viewed items for the user. In certain embodiments, the one or more features associated with the user and also associated with the recently viewed items for the use can include or overlap with the one or more training features.

In a number of embodiments, after training the machine learning model, system 310 further can: (a) perform the correlation analysis of the one or more training features to determine one or more first training features of the one or more training features based on one or more respective weights assigned by the machine learning model to the one or more training features; (b) update the training dataset to include only the one or more first training features in the historical input data; and (c) re-train the machine learning model based on the training dataset, as updated.

Figure 4:
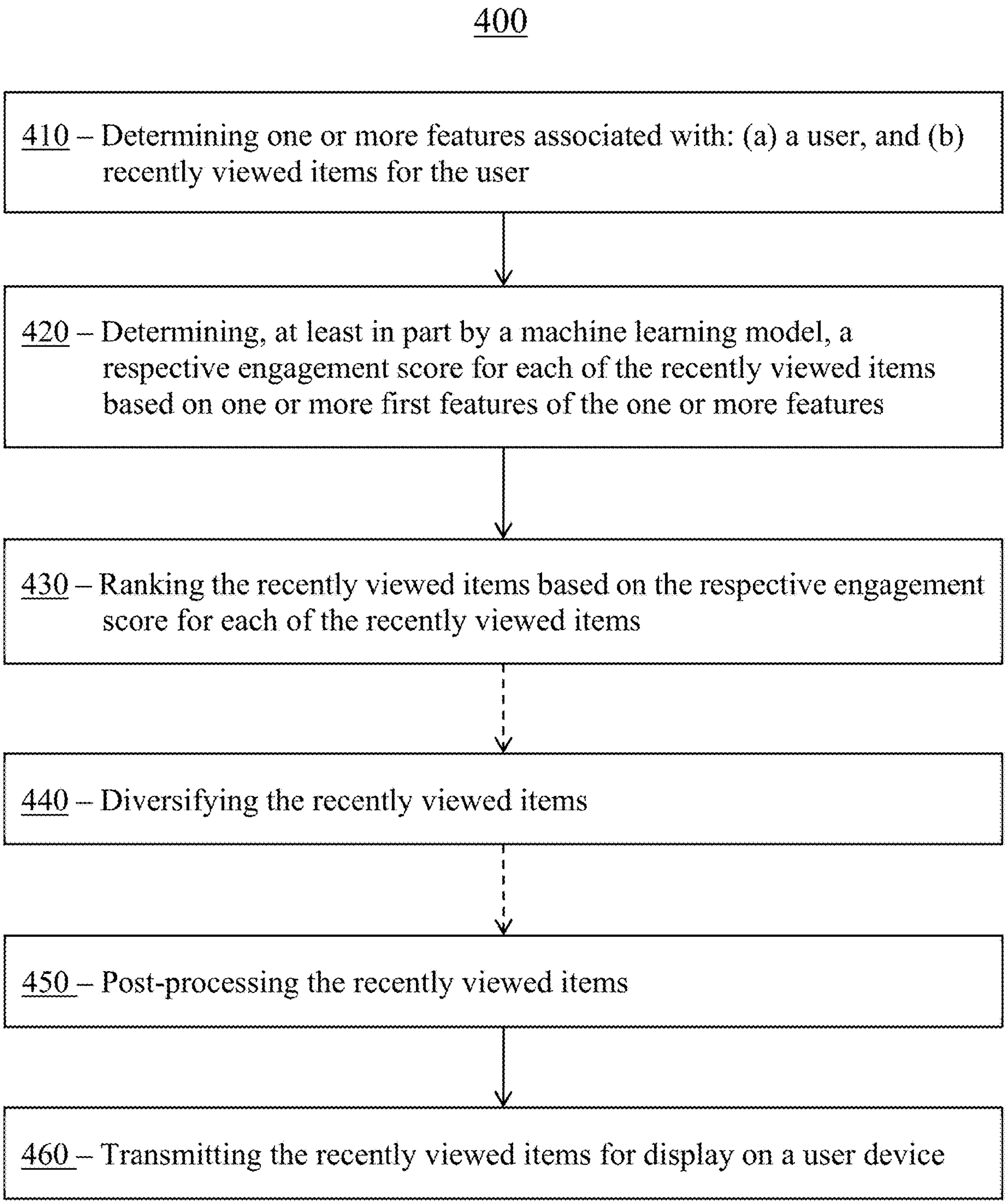
FIG. 4 illustrates a flow chart for a method of personalizing the ranking of recently viewed items, according to an embodiment.

Turning to FIG. 4, a flow chart is illustrated for a method 400 of personalizing a ranking of recently viewed items for display on a user device of a user, according to an embodiment. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3), system 310 (FIG. 3) (including one or more of its elements, modules, models, and/or systems, such as first ML model 3110 (FIG. 3), and/or second ML model 3120 (FIG. 3), etc.), and/or front-end system 320 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as system 300 (FIG. 3), system 310 (FIG. 3), or front-end system 320 (FIG. 3). The processor(s) can be similar or identical to the processor(s) described above with respect to computer system 100 (FIG. 1).

Referring to FIG. 4, method 400 can include a block 410 of determining one or more features associated with: (a) a user, and (b) recently viewed items for the user. The recently viewed items can be engaged by the user in one or more prior sessions and/or a current session at a front-end system (e.g., a web server, front-end system 320 (FIG. 3)). The one or more features can be obtained or extracted from various sources (e.g., a user database, a product database, database(s) 350 (FIG. 3), etc.), such as (a) historical behavior of the user (e.g., the recency, frequency, and/or dwell time) in one or more prior sessions; (b) historical engagement data collected from the one or more prior sessions; (c) current behavior of the user in the current session; (d) current engagement data collected from the current session; (e) item statistics of the recently viewed items (e.g., trending items, bestsellers, the seasonality and one or more other scores for each item); (f) pricing for the recently viewed items; (g) one or more promotions for the recently viewed items; and/or (h) one or more user propensities (e.g., affinities to brands, attributes, taxonomy, etc.), etc. In a few embodiments, if a feature of the one or more features can be found in a database (e.g., the user database, the product database, database(s) 350 (FIG. 3)), block 410 can obtain the feature from the database. If the feature of the one or more features cannot be found in the database, after extracting the feature, block 410 further can include storing the feature, as extracted, in the database (e.g., database(s) 350 (FIG. 3)) for future use.

In many embodiments, method 400 further can include a block 420 of determining, at least in part via a machine learning model (e.g., first ML model 3110 (FIG. 3)), a respective engagement score for each of the recently viewed items based on one or more first features of the one or more features determined in block 410. In a number of embodiments, before using the machine learning model to determine the respective engagement score for a recently viewed item, block 420 can determine whether a prior engagement score for the recently viewed item determined within an expiration time (e.g., 1 day, 3 days, a week, 10 days, etc.) exists in a database (e.g., a user database, database(s) 350 (FIG. 3), etc.), and then use the prior engagement score from the database as the respective engagement score for this recently viewed item.

In some embodiments, before using the machine learning model to determine the respective engagement score for each recently viewed item, block 420 can include pre-training, training, and/or re-training the machine learning model and/or performing a correlation analysis of the one or more features in a training process of the machine learning model to determine the one or more first features based on a criterion. An exemplary criterion can be that each of the one or more first features has a respective normalized weight greater than a threshold (e.g., 0.5%, 2%, 5%, etc.). Another exemplary criterion can be that the sum of the respective normalized weight for each first feature is greater than another threshold (e.g., 88%, 92%, 98.5%, etc.).

In a number of embodiments, method 400 also can include a block 430 of ranking the recently viewed items based on the respective engagement score for each of the recently viewed items, as determined in block 420. In many embodiments, the recently viewed items, as ranked in block 430, can be sorted in any suitable order. When the recently viewed items are ranked and sorted in a descending order based on the respective engagement score, it can be easier for the user to find the item(s) the user is interested in and then re-engage.

In many embodiments, method 400 additionally can include a block 440 of diversifying the recently viewed items, as ranked in block 430, across item categories, brands, or colors. Diversifying the recently viewed items further can be useful for increasing the likelihood of user re-engagement with the recently viewed items, especially after sales periods. This is because customers generally window shop for many items during a sales period, including items that the customers usually show little interest (e.g., items for gifting, etc.) or rarely buy without sales, the recently viewed items after the sales period without diversity thus may not be able to nudge the customers for re-engagement.

Figure 6:
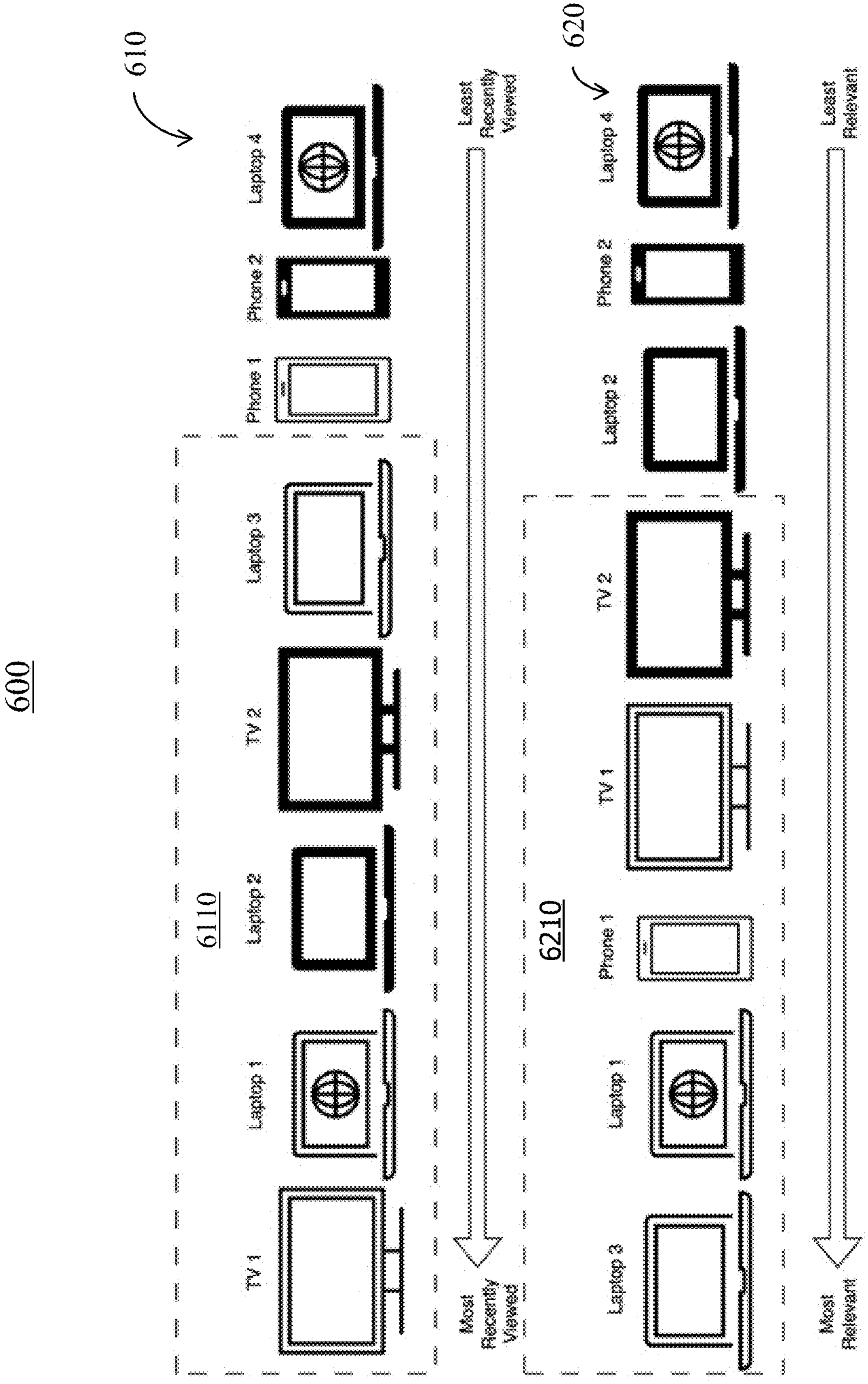
FIG. 6 illustrates an exemplary list of recently viewed items before and after re-ranking, according to an embodiment.

In an exemplary embodiment as shown in FIG. 6, an original list of the recently viewed items (e.g., an RVI list 610) for a user can be listed in a reverse chronological order (from left to right) based on the time the user engaged with each item. After (a) ranking the recently viewed items for the user based at least in part on the user's relatively higher affinities to the item category: "electronics" and the product color: "white" at block 430, and (b) diversifying the recently viewed items at block 440 to include greater diversification across product types (e.g., "Laptops," "TVs," "Phones," etc.), some items (e.g., "Laptop 3" and "Phone 1") can become higher up, and other items (e.g., "Laptop 2," "TV 1," and "TV 2") can become lower, in the list of the recently viewed items (e.g., an RVI list 620). As a result, more white and more diverse electronics products are ranked higher in RVI list 620, compared to RVI list 610.

In some embodiments, block 440 can diversify the recently viewed items by using a second machine learning model (e.g., second ML model 3120 (FIG. 3), an MAB model, a neural network model, etc.) trained to re-rank the recently viewed items based on one or more of: item taxonomies, brands, or colors of the recently viewed items. The second machine learning model can be pre-trained, trained, and/or re-trained by block 440. In many embodiments, the second machine learning model can be similar or different than the machine learning model (e.g., first ML model 3110 (FIG. 3)) used at block 420.

Figure 7:
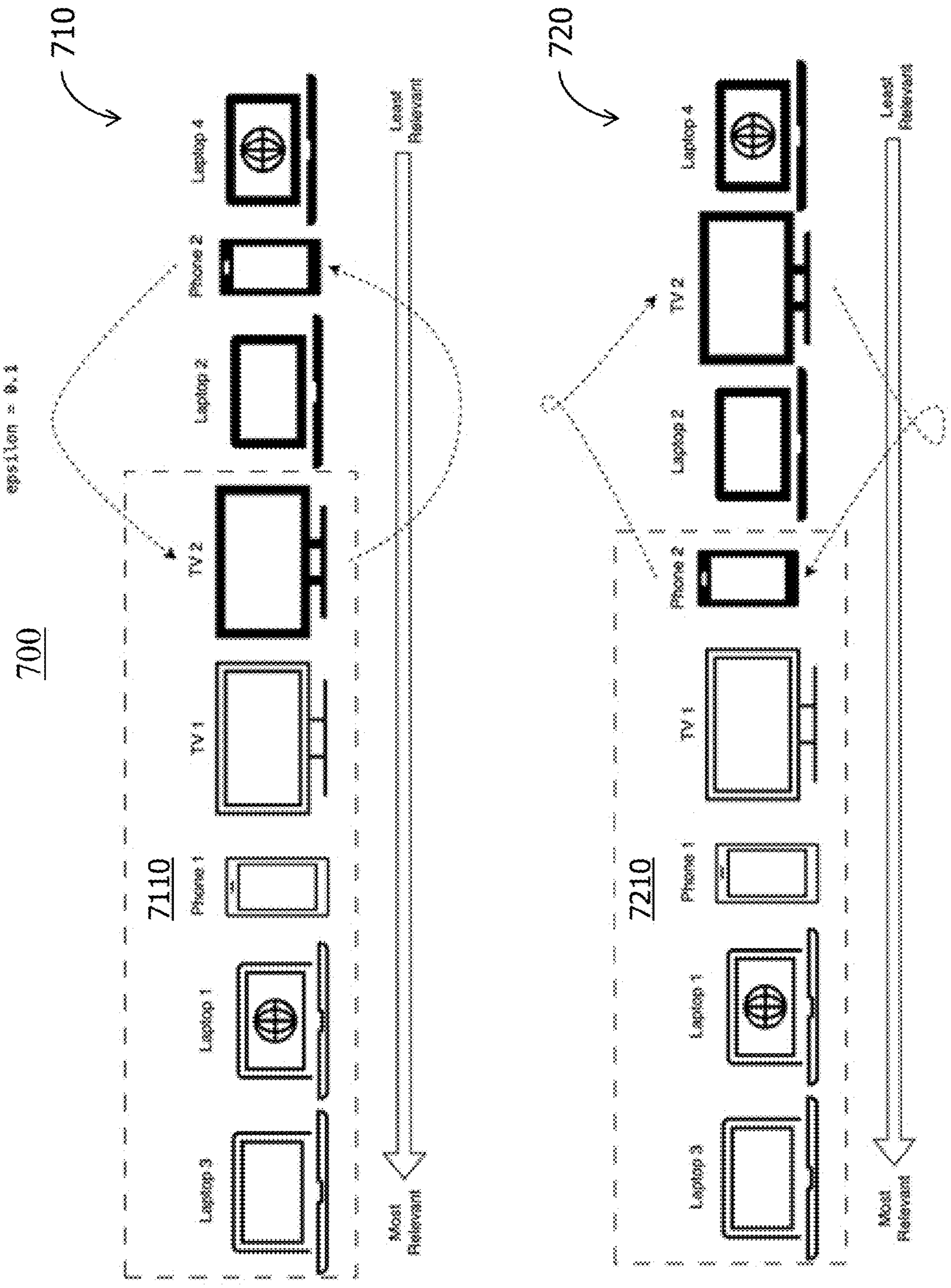
FIG. 7 illustrates an exemplary list of recently viewed items before and after re-ranking, according to another embodiment.

In an example as shown in FIG. 7, the second machine learning model can include an epsilon-greedy MAB algorithm with an epsilon of 0.1 (e.g., a 10% chance of exploration). With this algorithm, block 440 (FIG. 4) can, at 10% chance, randomly picks two items in the recently viewed items in an RVI list 710 for a user and swaps the two selected items to diversify the top ranking items in the resulting RVI list 720. In similar or different embodiments, such an epsilon-greedy MAB algorithm can be useful in addressing the cold start issue when the user is new to the second machine learning model and for diversification of recommendations.

Still referring to FIG. 4, in some embodiments, method 400 further can include a block 450 of post-processing the recently viewed items, as ranked in block 430 and/or diversified in block 440. In many embodiments, block 450 can include filtering out one or more filtered items from the recently viewed items based on one or more criteria. Examples of the one or more criteria for determining a filtered item from the one or more recently viewed items can include: (a) whether the filtered item is out-of-stock; (b) whether the filtered item includes sensitive content (e.g., nudity, graphic violence, etc.); and/or (c) whether the filtered item is included in one or more user-specified constraints (e.g., the user-specified price range, the user-specified color(s), etc.).

In some embodiments, block 450 also can include removing one or more low-ranking items from the recently viewed items. For example, the one or more low-ranking items can be those ranked lower than a predetermined rank/percentage limit (e.g., 5, 10, 25, or 10%, 30%, etc.) in the recently viewed items, as ranked in block 430 and/or diversified in block 440. In the exemplary embodiments in FIGS. 6-7, block 450 (FIG. 4) can reduce RVI list 610 (FIG. 6) to the top 5 items to become RVI list 6110 (FIG. 6), reduce RVI list 620 (FIG. 6) to the top 5 items to become RVI list 6210 (FIG. 6), reduce RVI list 710 (FIG. 7) to the top 5 items to become RVI list 7110 (FIG. 7), and/or reduce RVI list 720 (FIG. 7) to the top 5 items to become RVI list 7210 (FIG. 7).

Referring back to FIG. 4, in many embodiments, method 400 further can include a block 460 of transmitting the recently viewed items for the user, as ranked in block 430, diversified in block 440, and/or processed in block 450, for display on a user device (e.g., user device(s) 330 (FIG. 3)).

Figure 5:
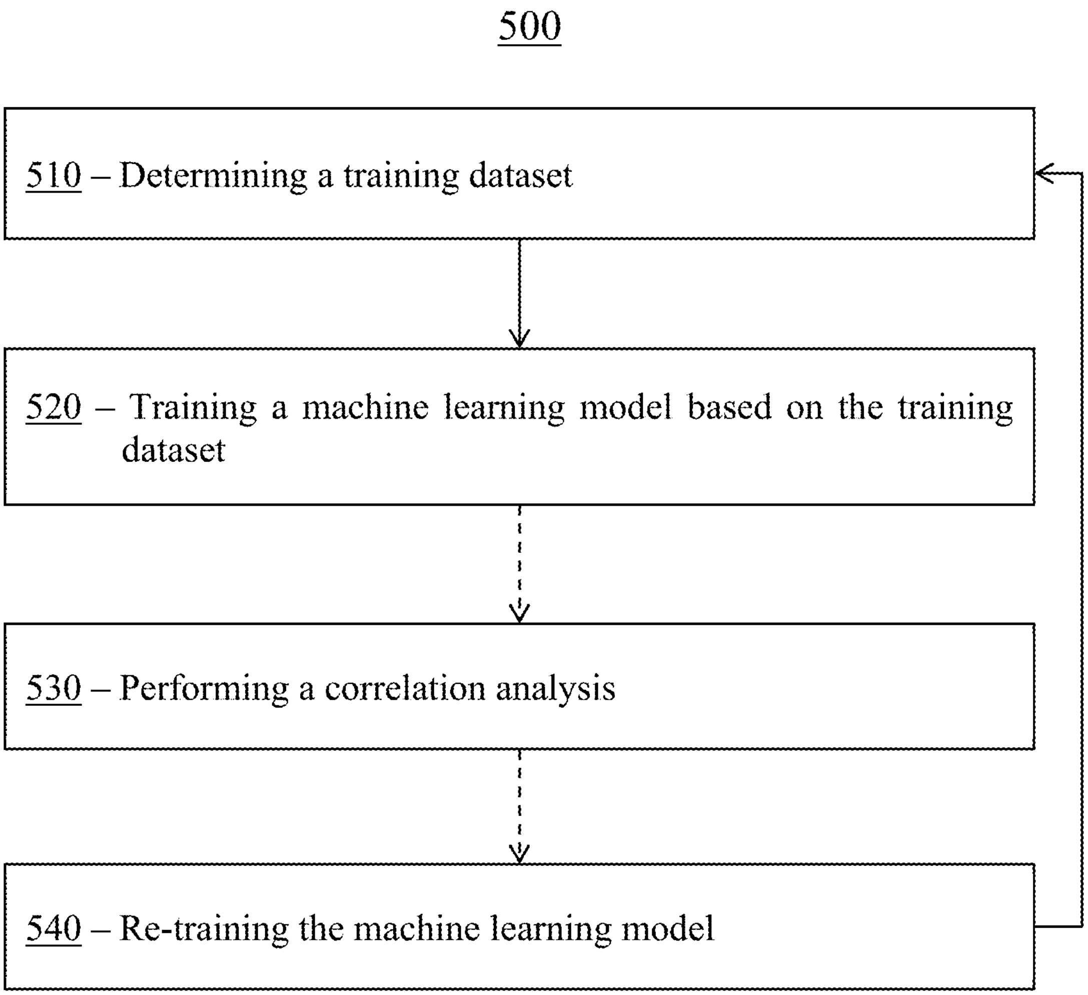
FIG. 5 illustrates a flow chart for a method of training a machine learning model, according to an embodiment.

Continuing with the drawings, FIG. 5 illustrates a flow chart for a method 500 of training a machine learning model, according to an embodiment. Method 500 is merely exemplary and is not limited to the embodiments presented herein. Method 500 can be employed in many different embodiments or examples not specifically depicted or described herein. In many embodiments, the machine learning model can include any suitable algorithms (e.g., MAB algorithms, linear regression algorithms, Lasso algorithms, gradient boosting algorithms, etc.) and can be trained to determine or predict any suitable values (e.g., an engagement rate, a minimum rank threshold, a life expectancy, a performance index, etc.) or to perform any suitable acts (e.g., re-ranking a list of items, correcting labels of an item, etc.). For example, the machine learning model can be trained by method 500 to determine an engagement score for an item by a user or to re-arrange a list of items to promote diversity. In many embodiments, method 500 can be adopted by method 400 (FIG. 4), block 420 (FIG. 4), or block 440 (FIG. 4).

In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped.

In many embodiments, system 300 (FIG. 3) or system 310 (FIG. 3) (including one or more of its elements, modules, models, and/or systems, such as first ML model 3110 (FIG. 3), and/or second ML model 3120 (FIG. 3), etc.) can be suitable to perform method 500 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of a computer system such as system 300 (FIG. 3) or system 310 (FIG. 3). The processor(s) can be similar or identical to the processor(s) described above with respect to computer system 100 (FIG. 1).

Referring to FIG. 5, method 500 can include a block 510 of determining a training dataset. In several embodiments, the training dataset can include synthetic training data generated in block 510 or obtained from one or more internal or external databases (e.g., database(s) 350 (FIG. 3)) or one or more third parties (e.g., a vendor's server, a manufacturer's website, etc.). In some embodiments, the training dataset further can include historical input data and historical output data.

In many embodiments, the historical input data can include one or more training features associated with customers and historically-engaged items for the customers. The historical output data can include whether the customers engaged with the historically-engaged items. Exemplary customer engagements can include click-throughs, add-to-carts, purchases, etc. In certain embodiments, the historical input data can include: (a) multiple lists of historically-engaged items for customers, (b) one or more training features associated with the customers and the historically-engaged items, and (c) a respective score assigned to each of the historically-engaged items. The historical output data can include an adjusted respective score for each of the historically-engaged items determined to meet one or more goals (e.g., to increase diversity in the lists across item categories, brands, and/or colors). In similar or different embodiments, the historical input data can include: (a) lists of prior-engaged items by customers and one or more training features, and (b) one or more training features associated with the customers and the prior-engaged items. The historical output data can include the lists of the prior-engaged items, sorted or re-arranged to promote diversity within each list. In a number of embodiments, block 510 further can include determining a validation dataset and/or a test dataset corresponding to the training dataset.

In many embodiments, method 500 additionally can include a block 520 of training a machine learning model (e.g., first ML model 3110 (FIG. 3), second ML model 3120 (FIG. 3), etc.) based on the training dataset, as determined in block 510. Block 520 can repeatedly perform the training based on the training dataset until a predetermined condition (e.g., a confidence level or predetermined rounds of training) is met. In several embodiments, after a training process, block 520 additionally can validate or test the machine learning model, as trained, based on the validation dataset or the test dataset, as determined in block 510.

In a number of embodiments, method 500 further can include a block 530 of performing a correlation analysis of the input of the machine learning model (e.g., the one or more training features in the training dataset). The correlation analysis in block 530 can be used to determine one or more first training features of the one or more training features based on the respective importance or weight of each training feature determined during or after the training process in block 520. In several embodiments, block 530 can determine the one or more first training features by removing the one or more remaining training features of the one or more training features, each of the one or more remaining training features having the respective weight below a predetermined threshold (e.g., 0.5%, or the bottom 10 at the one or more training features ranked based on the respective importance or weight, etc.). In similar or different embodiments, block 530 can determine the one or more first training features by removing the one or more remaining training features of the one or more training features with lower respective weights based on a sum of the respective weights of the one or more first training features. For example, in an embodiment, the one or more first training features can be determined when: (a) the respective weight of each first training feature is no less than that of each remaining feature, and (b) the sum of the respective weights of the one or more first training features is no less or greater than a predetermined limit (e.g., 80%, 87%, 92%, 99%, etc.).

In many embodiments, method 500 further can include a block 540 of re-training the machine learning model. Block 540 can be performed occasionally or periodically. Retraining in block 540 can include re-determining the training dataset in block 510, re-training the machine learning dataset in block 520, and re-performing the correlation analysis in block 530. In a few embodiments, re-determining the training dataset in block 510 can include updating the training dataset to include only the one or more first training features in the historical input data. In a number of embodiments, the training dataset, as updated, further can be updated to include historical input data and historical output data newly created and collected after the previous training process.

Various embodiments can include a system for personalizing the ranking of recently viewed items for a user. The system can include one or more processors and one or more non-transitory computer-readable media. The one or more non-transitory computer-readable media can store computing instructions configured to, when run on the one or more processors, cause the one or more processors to perform one or more acts. In many embodiments, the one or more acts can include determining one or more features associated with a user and also associated with recently viewed items for the user. The recently viewed items can be engaged by the user in one or more prior sessions or a current session. In a number of embodiments, the act of determining the one or more features associated with the user and also associated with the recently viewed items can include extracting the one or more features from one or more of: (a) historical behavior of the user in one or more prior sessions; (b) current behavior of the user in a current session; (c) one or more propensities of the user; (d) item statistics of the recently viewed items; (e) pricing of the recently viewed items; or (f) one or more promotions for the recently viewed items. In some embodiments, the one or more features, as extracted, can include one or more vector embeddings associated with the user and/or one or more respective vector embeddings associated with each recently viewed item.

In several embodiments, the one or more acts further can include determining, at least in part by a machine learning model (e.g., first ML model 3110 (FIG. 3)), a respective engagement score for each of the recently viewed items based on one or more first features of the one or more features. The one or more first features can be determined by a correlation analysis of the one or more features in a training process of the machine learning model. In some embodiments, the act of determining the respective engagement score for each of the recently viewed items can include, upon determining that a respective prior engagement score determined within an expiration time for each of the recently viewed items exists, using the respective prior engagement score as the respective engagement score.

In many embodiments, the one or more acts further can include ranking the recently viewed items based on the respective engagement score for each of the recently viewed items. In a few embodiments, the one or more acts additionally can include after ranking the recently viewed items based on the respective engagement score, diversifying the recently viewed items across item categories, brands, or colors. The act of diversifying the recently viewed items can include using a second machine learning model (e.g., second ML model 3120 (FIG. 3)) trained to re-rank the recently viewed items based on one or more of: item taxonomies, brands, or colors of the recently viewed items.

In many embodiments, the one or more acts further can include transmitting, via a computer network to a user device of the user, the recently viewed items, as ranked, for display on the user device. In a number of embodiments, the one or more acts also can include filtering out one or more filtered items from the recently viewed items, wherein each of the one or more filtered items is one or more of: out-of-stock, sensitive, or included in one or more user-specified constraints. In several embodiments, the one or more acts further can include before transmitting the recently viewed items for display on the user device, removing one or more low-ranking items from the recently viewed items. The one or more low-ranking items can be ranked lower than a predetermined rank limit in the recently viewed items, as ranked.

In a number of embodiments, the one or more acts further can include before determining the respective engagement score, training the machine learning model based on a training dataset. The training dataset can include historical input data and historical output data. The historical input data can include one or more training features associated with customers and historically-engaged items for the customers. The historical output data can include whether the customers engaged with the historically-engaged items. The customers can include the user. The one or more features can include the one or more training features.

In some embodiments, the one or more acts additionally can include, after training the machine learning model, performing the correlation analysis of the one or more training features to determine one or more first training features of the one or more training features based on one or more respective weights assigned by the machine learning model to the one or more training features. The one or more acts also can include updating the training dataset to include only the one or more first training features in the historical input data. The one or more acts further can include re-training the machine learning model based on the training dataset, as updated. The training process can include training the machine learning model and re-training the machine learning model.

Various embodiments further can include a method for personalizing the ranking of recently viewed items for a user. The method can be implemented via execution of computing instructions configured to run at one or more processors and stored at one or more non-transitory computer-readable media. In many embodiments, the method can include: (a) determining one or more features associated with a user and also associated with recently viewed items for the user; (b) determining, at least in part by a machine learning model, a respective engagement score for each of the recently viewed items based on one or more first features of the one or more features, wherein: the one or more first features are determined by a correlation analysis of the one or more features in a training process of the machine learning model; (c) ranking the recently viewed items based on the respective engagement score for each of the recently viewed items; and (d) transmitting, via a computer network to a user device of the user, the recently viewed items, as ranked, for display on the user device.

In many embodiments, the method further can include, after ranking the recently viewed items based on the respective engagement score, diversifying the recently viewed items across item categories, brands, or colors. Diversifying the recently viewed items can include using a second machine learning model trained to re-rank the recently viewed items based on one or more of: item taxonomies, brands, or colors of the recently viewed items. Determining the one or more features associated with the user and also associated with the recently viewed items can include extracting the one or more features from one or more of: (a) historical behavior of the user in one or more prior sessions; (b) current behavior of the user in a current session; (c) one or more propensities of the user; (d) item statistics of the recently viewed items; (e) pricing of the recently viewed items; or (f) one or more promotions for the recently viewed items. In some embodiments, the one or more features, as extracted, can include one or more vector embeddings associated with the user and/or one or more respective vector embeddings associated with each recently viewed item.

In a number of embodiments, the method further can include, before transmitting the recently viewed items for display on the user device, filtering out one or more filtered items from the recently viewed items, wherein each of the one or more filtered items is one or more of: out-of-stock, sensitive, or included in one or more user-specified constraints. In some embodiments, the method additionally can include, before transmitting the recently viewed items for display on the user device, removing one or more low-ranking items from the recently viewed items, wherein the one or more low-ranking items are ranked lower than a predetermined rank limit in the recently viewed items, as ranked.

In several embodiments, the recently viewed items can be engaged by the user in one or more prior sessions or a current session. Determining the respective engagement score for each of the recently viewed items can include, upon determining that a respective prior engagement score determined within an expiration time for each of the recently viewed items exists, using the respective prior engagement score as the respective engagement score.

In many embodiments, the method also can include, before determining the respective engagement score, training the machine learning model based on a training dataset. The training dataset can include historical input data and historical output data. The historical input data can include one or more training features associated with customers and historically-engaged items for the customers. The historical output data can include whether the customers engaged with the historically-engaged items. The customers can include the user, and the one or more features can include the one or more training features.

In some embodiments, the method further can include: (a) after training the machine learning model, performing the correlation analysis of the one or more training features to determine one or more first training features of the one or more training features based on one or more respective weights assigned by the machine learning model to the one or more training features: (b) updating the training dataset to include only the one or more first training features in the historical input data; and (c) re-training the machine learning model based on the training dataset, as updated. The training process can include training and re-training the machine learning model.

Although personalizing the ranking of the recently viewed items for a user has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIGS. 4-5 can include different procedures, processes, and/or activities and can be performed by many different models or layers, in many different orders. As another example, the modules, models, elements, and/or systems within system 300, system 310, or front-end system 320 in FIG. 3 or used in method 400 in FIG. 4 can be interchanged or otherwise modified. Further, the systems and/or methods can include training first ML model 3110 or second ML model 3120 in system 300 or 310 in FIG. 3 based on training datasets and/or feedback from the system or server. Moreover, the systems and/or methods can include optimizing first ML model 3110 or second ML model 3120 in system 300 or 310 in FIG. 3 by adjusting the hyper-parameters used.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

one or more processors; and one or more non-transitory computer-readable media storing computing instructions configured to, when run on the one or more processors, cause the one or more processors to perform:

determining one or more features associated with a user and also associated with recently viewed items for the user;

training a machine learning model on a training dataset comprising the one or more features;

determining, by the machine learning model, respective weights for the one or more features;

determining, based on the respective weights, which ones of the one or more features have a greater-than-a-threshold effect on an output of the machine learning model;

determining one or more first features of the one or more features by a correlation analysis that selects the determined ones of the one or more features having the greater-than-a-threshold effect on the output of the machine learning model;

updating the training dataset to include the one or more first features and remove the remaining of the one or more features;

re-training the machine learning model based on the updated training dataset;

determining, at least in part by the machine learning model, a respective engagement score for each of the recently viewed items based on the one or more first features;

ranking the recently viewed items based on the respective engagement score for each of the recently viewed items; and transmitting, via a computer network to a user device of the user, the recently viewed items, as ranked, for display on the user device.

2. The system in claim 1, wherein the computing instructions are further configured to cause the one or more processors to perform:

after ranking the recently viewed items based on the respective engagement score, diversifying the recently viewed items across item categories, brands, or colors.

3. The system in claim 2, wherein diversifying the recently viewed items comprises:

using a second machine learning model trained to re-rank the recently viewed items based on one or more of: item taxonomies, brands, or colors of the recently viewed items.

4. The system in claim 1, wherein determining the one or more features associated with the user and also associated with the recently viewed items comprises extracting the one or more features from one or more of:

historical behavior of the user in one or more prior sessions;

current behavior of the user in a current session;

one or more propensities of the user;

item statistics of the recently viewed items;

pricing of the recently viewed items; or one or more promotions for the recently viewed items.

5. The system in claim 1, wherein the computing instructions are further configured to cause the one or more processors to perform:

before transmitting the recently viewed items for display on the user device, filtering out one or more filtered items from the recently viewed items, wherein each of the one or more filtered items is one or more of: out-of-stock, sensitive, or included in one or more user-specified constraints.

6. The system in claim 1, wherein:

before transmitting the recently viewed items for display on the user device, removing one or more low-ranking items from the recently viewed items, wherein the one or more low-ranking items are ranked lower than a predetermined rank limit in the recently viewed items, as ranked.

7. The system in claim 1, wherein the recently viewed items were engaged by the user in one or more prior sessions or a current session; and determining the respective engagement score for each of the recently viewed items comprises, upon determining that a respective prior engagement score determined within an expiration time for each of the recently viewed items exists, using the respective prior engagement score as the respective engagement score.

8. The system in claim 1, wherein:

the training dataset comprises historical input data and historical output data;

the historical input data comprise:

one or more training features associated with customers and historically-engaged items for the customers;

the historical output data comprise whether the customers engaged with the historically-engaged items;

the customers comprise the user; and the one or more features comprise the one or more training features.

9. The system in claim 8, wherein the computing instructions are further configured to cause the one or more processors to perform:

after training the machine learning model, performing the correlation analysis of the one or more training features to determine one or more first training features of the one or more training features based on one or more respective weights assigned by the machine learning model to the one or more training features; and updating the training dataset to include the one or more first training features in the historical input data and remove the remaining of the one or more training features.

10. The system of claim 1, wherein determining which ones of the one or more features have the greater-than-a-threshold effect on the output of the machine learning model comprises determining that each of the one or more first features has a respective weight greater than a threshold.

11. The system of claim 1, wherein determining which ones of the one or more features have the greater-than-a-threshold effect on the output of the machine learning model comprises determining that that a sum of weights associated with the one or more first features is greater than a threshold.

12. A method being implemented via execution of computing instructions configured to run at one or more processors and stored at one or more non-transitory computer-readable media, the method comprising:

determining one or more features associated with a user and also associated with recently viewed items for the user;

training a machine learning model on a training dataset comprising the one or more features;

determining, by the machine learning model, respective weights for the one or more features;

determining, based on the respective weights, which ones of the one or more features have a greater-than-a-threshold effect on an output of the machine learning model;

determining one or more first features of the one or more features by a correlation analysis that selects the determined ones of the one or more features having the greater-than-a-threshold effect on the output of the machine learning model;

updating the training dataset to include the one or more first features and remove the remaining of the one or more features;

re-training the machine learning model based on the updated training dataset;

determining, at least in part by the machine learning model, a respective engagement score for each of the recently viewed items based on the one or more first features;

ranking the recently viewed items based on the respective engagement score for each of the recently viewed items; and transmitting, via a computer network to a user device of the user, the recently viewed items, as ranked, for display on the user device.

13. The method in claim 12, further comprising:

after ranking the recently viewed items based on the respective engagement score, diversifying the recently viewed items across item categories, brands, or colors.

14. The method in claim 13, wherein diversifying the recently viewed items comprises:

using a second machine learning model trained to re-rank the recently viewed items based on one or more of: item taxonomies, brands, or colors of the recently viewed items.

15. The method in claim 12, wherein determining the one or more features associated with the user and also associated with the recently viewed items comprises extracting the one or more features from one or more of:

historical behavior of the user in one or more prior sessions;

current behavior of the user in a current session;

one or more propensities of the user;

item statistics of the recently viewed items;

pricing of the recently viewed items; or one or more promotions for the recently viewed items.

16. The method in claim 12, further comprising:

before transmitting the recently viewed items for display on the user device, filtering out one or more filtered items from the recently viewed items, wherein each of the one or more filtered items is one or more of: out-of-stock, sensitive, or included in one or more user-specified constraints.

17. The method in claim 12, wherein:

before transmitting the recently viewed items for display on the user device, removing one or more low-ranking items from the recently viewed items, wherein the one or more low-ranking items are ranked lower than a predetermined rank limit in the recently viewed items, as ranked.

18. The method in claim 12, wherein the recently viewed items were engaged by the user in one or more prior sessions or a current session; and determining the respective engagement score for each of the recently viewed items comprises, upon determining that a respective prior engagement score determined within an expiration time for each of the recently viewed items exists, using the respective prior engagement score as the respective engagement score.

19. The method in claim 12, wherein:

the training dataset comprises historical input data and historical output data;

the historical input data comprise one or more training features associated with customers and historically-engaged items for the customers;

the historical output data comprise whether the customers engaged with the historically-engaged items;

the customers comprise the user; and the one or more features comprise the one or more training features.

20. The method in claim 19, further comprising:

after training the machine learning model, performing the correlation analysis of the one or more training features to determine one or more first training features of the one or more training features based on one or more respective weights assigned by the machine learning model to the one or more training features; and updating the training dataset to include the one or more first training features in the historical input data and remove the remaining of the one or more training features.

* * * * *